United States Patent
Mitsunari et al.

(10) Patent No.: US 10,549,724 B2
(45) Date of Patent: Feb. 4, 2020

(54) EJECTION NOZZLE MEMBER

(71) Applicants: Honda Access Corp., Niiza-shi, Saitama (JP); KOITO MANUFACTURING CO., LTD., Tokyo (JP)

(72) Inventors: Takahiro Mitsunari, Niiza (JP); Kazuki Hikawa, Niiza (JP); Takumi Yonezawa, Niiza (JP); Akinobu Kubota, Shizuoka (JP)

(73) Assignees: HONDA ACCESS CORP., Niiza-shi, Saitama (JP); KOITO MANUFACTURING CO., LTD., Tokyo (JP)

( * ) Notice: Subject to any disclaimer, the term of this patent is extended or adjusted under 35 U.S.C. 154(b) by 154 days.

(21) Appl. No.: 15/909,003

(22) Filed: Mar. 1, 2018

(65) Prior Publication Data
US 2018/0251100 A1   Sep. 6, 2018

(30) Foreign Application Priority Data

Mar. 2, 2017 (JP) .................. 2017-039408

(51) Int. Cl.
| | |
|---|---|
| *F26B 25/00* | (2006.01) |
| *B60S 1/54* | (2006.01) |
| *B08B 5/02* | (2006.01) |
| *B60S 1/56* | (2006.01) |
| *G02B 27/00* | (2006.01) |

(52) U.S. Cl.
CPC ............. *B60S 1/54* (2013.01); *B08B 5/02* (2013.01); *B60S 1/56* (2013.01); *G02B 27/0006* (2013.01)

(58) Field of Classification Search
CPC ...... B60S 1/54; B60S 1/56; B60S 1/60; B08B 5/02; B08B 5/023; G02B 27/0006; B05B 1/005
USPC .......................... 34/242, 85, 413, 191, 667
See application file for complete search history.

(56) References Cited

U.S. PATENT DOCUMENTS

| | | | |
|---|---|---|---|
| 8,973,921 B2* | 3/2015 | Doane | F16J 15/025 277/329 |
| 2015/0296108 A1* | 10/2015 | Hayakawa | G03B 17/08 348/148 |
| 2015/0353024 A1* | 12/2015 | Cooper | B60R 11/04 348/148 |
| 2016/0325715 A1* | 11/2016 | Niemczyk | B60S 1/528 |
| 2017/0028968 A1 | 2/2017 | Kubota et al. | |

* cited by examiner

*Primary Examiner* — John P Mccormack
(74) *Attorney, Agent, or Firm* — Westerman, Hattori, Daniels & Adrian LLP

(57) ABSTRACT

An ejection nozzle member attached to a vehicle-mounted camera is formed from an elastic material, and includes a cover member mounted on an upper surface of a casing, the cover member having therein an air passage to which compressed air is supplied. A pair of seal members are formed in an air ejecting unit, from which the compressed air is ejected, on outer sides of the air passage in a widthwise direction. The seal members are formed in lip shapes, protruding downward and toward the center in the widthwise direction on a side of the air passage. When the ejection nozzle member is attached to the camera, distal ends of the seal members are placed in contact mutually on the side of the air passage, and are pressed toward the casing by the compressed air that flows in the air passage to thereby be placed in intimate contact therewith.

7 Claims, 5 Drawing Sheets

EJECTION NOZZLE MEMBER

CROSS-REFERENCE TO RELATED APPLICATION

This application is based upon and claims the benefit of priority from Japanese Patent Application No. 2017-039408 filed on Mar. 2, 2017, the contents of which are incorporated herein by reference.

BACKGROUND OF THE INVENTION

Field of the Invention

The present invention relates to an ejection nozzle member for ejecting compressed air in order to remove water droplets and the like adhered to a vehicle-mounted optical device mounted on a vehicle.

Description of the Related Art

Conventionally, for example, a foreign matter removal device has been known for removing water droplets or the like adhered to an external camera mounted on a vehicle, and for ensuring good visibility. In such a foreign matter removal device, for example, as disclosed in International Publication No. WO 2015/159763, a nozzle unit and a high pressure air generating unit are connected via piping. The nozzle unit is formed integrally with a vehicle-mounted camera, and is equipped with a mounting bracket fixed to a vehicle body or the like, and a nozzle from which high pressure air is ejected. In addition, the distal end of the nozzle is disposed so as to face a lens of the vehicle-mounted camera. After the high pressure air generated by the high pressure air generating unit is supplied to the nozzle through the piping, the high pressure air is sprayed from the nozzle toward the lens of the vehicle-mounted camera, whereby water droplets, dust and the like that are adhered to the lens are blown off.

SUMMARY OF THE INVENTION

However, with the configuration of the aforementioned International Publication No. WO 2015/159763, when the high pressure air is ejected from the nozzle, the nozzle rises up away from the vehicle-mounted camera due to the pressure of the high pressure air that passes through the air passage of the nozzle, and the water droplets or the like that were adhered to the surface of the vehicle-mounted camera or the nozzle unit enter into the air passage from the gap that occurs between the two members, and the droplets or the like move again through the air passage toward the side of the lens and become adhered thereto.

A general object of the present invention is to provide an ejection nozzle member which is capable of ensuring sealing performance when compressed air is ejected, and reliably preventing water droplets, dust and the like from entering an air ejecting unit.

The present invention is characterized by an ejection nozzle member configured to eject compressed air with respect to a lens surface of a vehicle-mounted optical device, including:

a cover member attached to the vehicle-mounted optical device and having therein an air passage through which the compressed air flows;

a pipe connecting part provided on the cover member and configured to supply the compressed air to the air passage; and an air ejecting unit formed at an end of the cover member and communicating with the air passage, the air ejecting unit being configured to eject the compressed air toward the lens surface;

wherein the air ejecting unit is formed to have a clearance between the air ejecting unit and the lens surface in the cover member, a seal member is formed on the cover member along a boundary with the air ejecting unit, and the seal member is formed in an inclined manner toward a side of the air ejecting unit.

According to the present invention, the ejection nozzle member for ejecting the compressed air toward the lens surface of the vehicle-mounted optical device includes the cover member attached to the vehicle-mounted optical device, and the air ejecting unit formed at the end of the cover member and communicating with the air passage to thereby eject the compressed air toward the lens surface. Further, the seal member is formed on the cover member along the boundary with the air ejecting unit, and the seal member is formed in an inclined manner toward the side of the air ejecting unit.

Accordingly, by the cover member being attached to the vehicle-mounted optical device, and the seal member being placed in abutment against the vehicle-mounted optical device, when the compressed air is supplied to the air ejecting unit while passing through the air passage and is ejected onto the lens surface, since the seal member, which is inclined toward the side of the air ejecting unit, is pressed by the compressed air against the vehicle-mounted optical device, using the compressed air, the seal member can be placed in more intimate contact with the vehicle-mounted optical device.

As a result, for example, even in the case that the cover member rises up in a direction away from the vehicle-mounted optical device due to the pressure of the compressed air in the air ejecting unit, the seal member is pressed in a direction in which the seal member comes into intimate contact with the vehicle-mounted optical device. Therefore, the state of abutment is reliably maintained, and entry of water droplets, dust and the like into the interior of the air ejecting unit through a gap between the ejection nozzle member and the vehicle-mounted optical device is reliably prevented.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Figure 1:
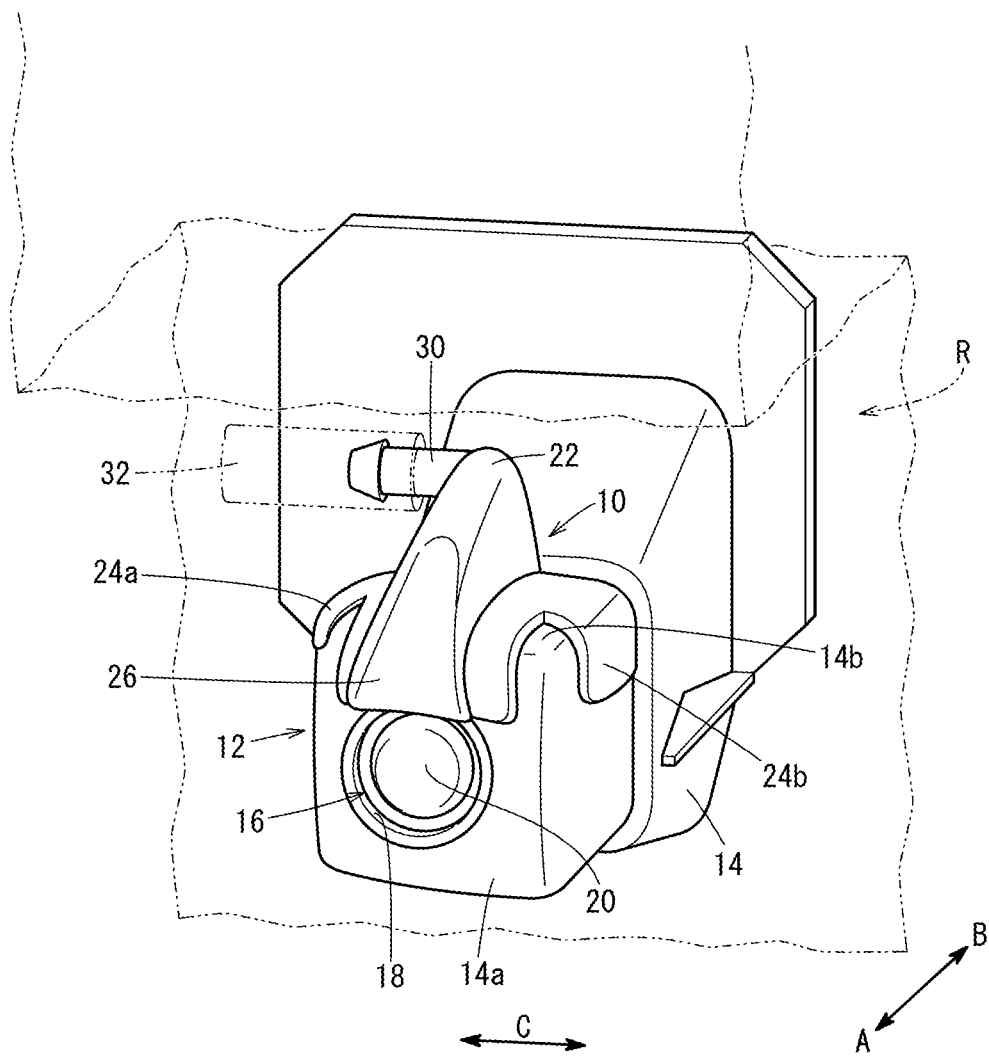
FIG. 1 is an external perspective view of an ejection nozzle member according to an embodiment of the present invention, and a vehicle-mounted camera to which the ejection nozzle member is attached.

Initially, a description will be presented of a vehicle-mounted camera (vehicle-mounted optical device) 12 to which an ejection nozzle member 10 is attached. As shown in FIG. 1, the vehicle-mounted camera 12, for example, is a rear camera disposed in proximity to the center of a rear gate R in a vehicle, and includes a casing 14 formed in a box shape having a substantially rectangular cross-sectional shape, and a camera 16 housed in the interior of the casing 14. A lens (lens surface) 20 of the camera 16 is provided so as to be exposed to the exterior through a lens hole 18 which is formed on a rear end surface (first surface) 14a of the casing 14.

In addition, in the vehicle-mounted camera 12, one end portion in the longitudinal direction (the direction of arrows A and B) of the casing 14 is fixed with respect to the rear gate R, and the lens 20 of the camera 16 faces rearward (in the direction of arrow A) in a protruding manner with respect to the rear gate R by a predetermined length. Further, the ejection nozzle member 10 is mounted on an upper surface (second surface) 14b of the casing 14, which lies substantially perpendicular to the rear end surface 14a on which the lens 20 is exposed to the exterior.

Next, the ejection nozzle member 10, which is attached to the vehicle-mounted camera 12, will be described.

Figure 2:
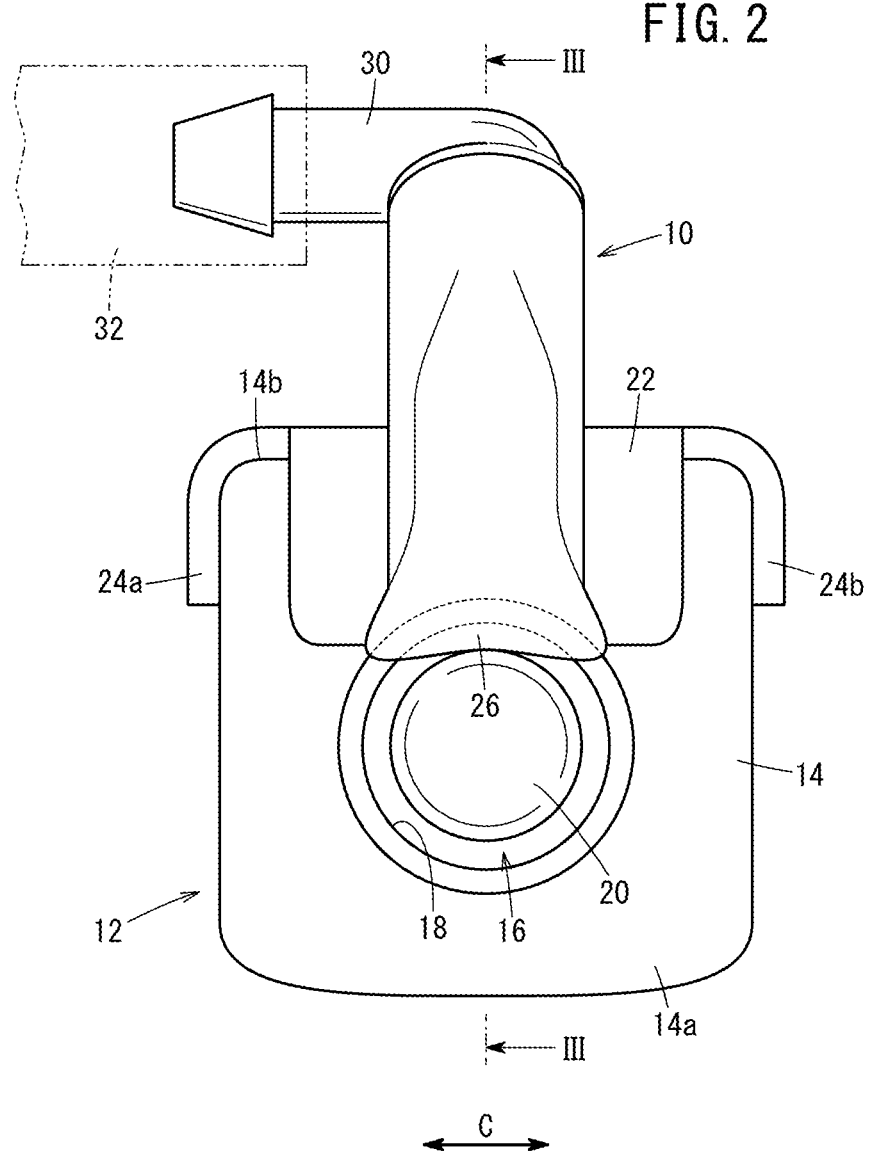
FIG. 2 is a front view of the ejection nozzle member and the vehicle-mounted camera shown in FIG. 1.
Figure 3:
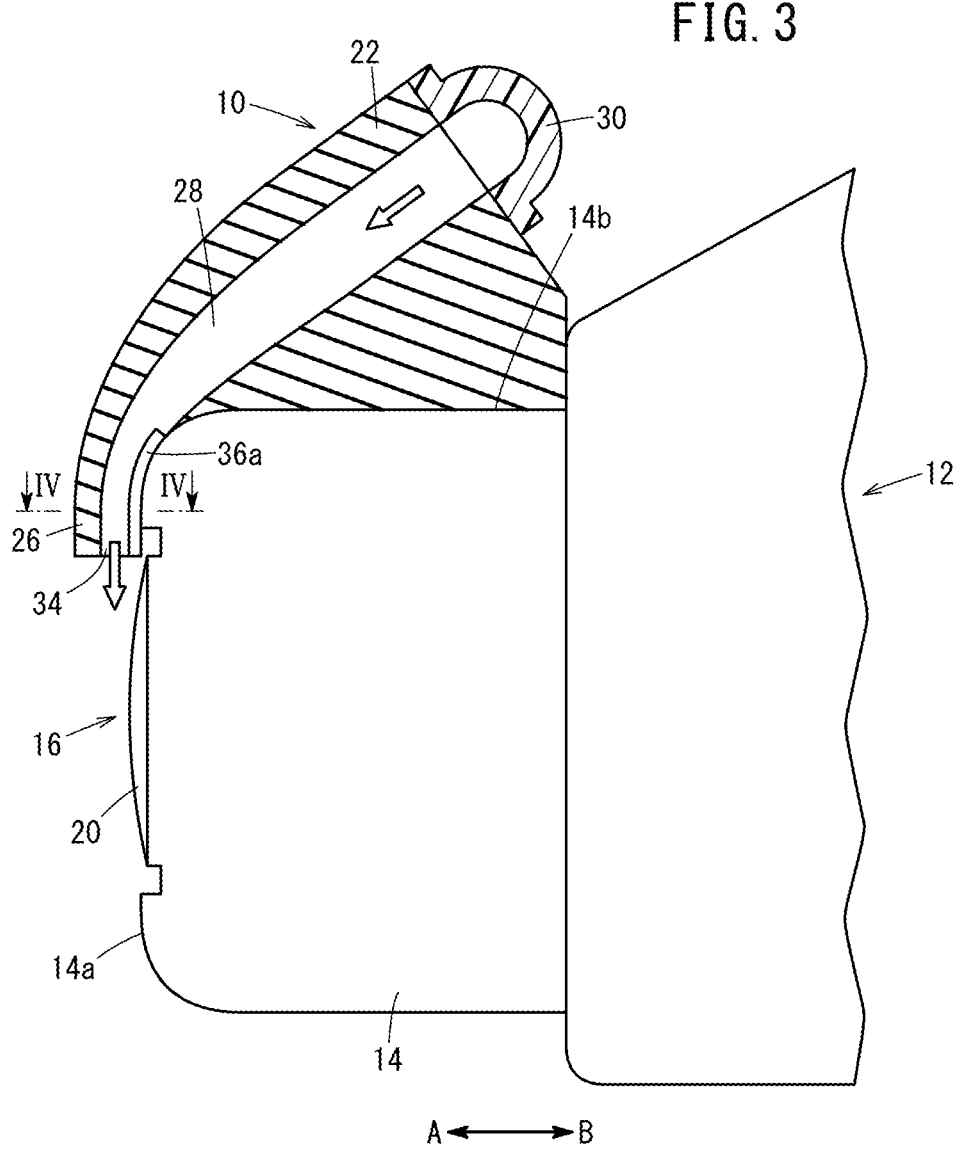
FIG. 3 is a cross-sectional view with partial omission taken along line III-III of FIG. 2.

As shown in FIGS. 1 to 3, the ejection nozzle member 10 is formed from an elastic material such as rubber or the like, and is mounted in covering relation to a portion of the vehicle-mounted camera 12. The ejection nozzle member 10 includes a cover member 22, a pair of retaining members 24a, 24b that protrude outwardly in a widthwise direction with respect to the cover member 22, and an air ejecting unit 26 formed on an end of the cover member 22 and through which compressed air is ejected.

The cover member 22 is disposed, for example, so as to cover portions of the substantially planar and horizontal upper surface 14b and the rear end surface 14a of the vehicle-mounted camera 12, and bulges obliquely upward so that the height of the cover member 22 gradually changes along the longitudinal direction (in the direction of arrows A and B) thereof. In addition, the lower surface of the cover member 22 is placed in abutment against the upper surface 14b of the vehicle-mounted camera 12, which is formed in a substantially planar shape.

Further, as shown in FIG. 3, an air passage 28, which extends from one end to the other end along the longitudinal direction (in the direction of arrows A and B), is formed in the cover member 22. The air passage 28 is formed, for example, with a rectangular cross section, which is wide in a widthwise direction (the direction of arrow C in FIG. 2) perpendicular to the longitudinal direction.

Furthermore, one end of the cover member 22 is formed at a highest location, and a tubular connecting pipe (pipe connecting part) 30 is connected to the one end. The connecting pipe 30 is bent perpendicularly with respect to a location connected to the cover member 22. One end of the connecting pipe 30 communicates with the air passage 28 inside the cover member 22, whereas piping 32 to which the compressed air is supplied is connected to the other end thereof that projects to the outside.

Additionally, the compressed air is supplied to the air passage 28 from a non-illustrated compressed air supply source through the piping 32 and the connecting pipe 30. Moreover, when installed on the vehicle-mounted camera 12, the other end of the cover member 22 is disposed at a lowest position.

The retaining members 24a, 24b are formed in plate shapes having a predetermined thickness, and are disposed respectively on outer sides in the widthwise direction (the direction of arrow C) perpendicular to the longitudinal direction of the cover member 22. The retaining members 24a, 24b are formed with L-shaped cross sections, which are bent at right angles downwardly after protruding in the widthwise direction from sides of the cover member 22. In addition, when the cover member 22 is installed in abutment against the upper surface 14b of the vehicle-mounted camera 12, the pair of retaining members 24a, 24b are placed in abutment respectively against the side surfaces of the vehicle-mounted camera 12, whereby the cover member 22 is retained in the widthwise direction (the direction of arrow C).

The air ejecting unit 26 is disposed on the other end of the cover member 22. When installed on the vehicle-mounted camera 12, the air ejecting unit 26 extends to the rear end surface 14a of the casing 14, and an end of the air ejecting unit 26 faces toward the opening of the lens hole 18. More specifically, the end of the air ejecting unit 26 extends to the vicinity of an outer edge of the lens 20 (There is a clearance between the air ejecting unit 26 and the lens 20.) (see FIG. 2).

Further, as shown in FIG. 3, the air passage 28 extending from the cover member 22 is formed in the interior of the air ejecting unit 26, and an ejection hole 34 is formed at an end thereof as an opening of the air passage 28. Further, in the air ejecting unit 26, the air passage 28 is formed so as to face directly toward the rear end surface 14a of the vehicle-mounted camera 12, and as shown in FIG. 4, on outer sides in the widthwise direction of the air passage 28, a pair of seal members 36a, 36b are provided, which abut against the rear end surface 14a of the vehicle-mounted camera 12.

Figure 4:
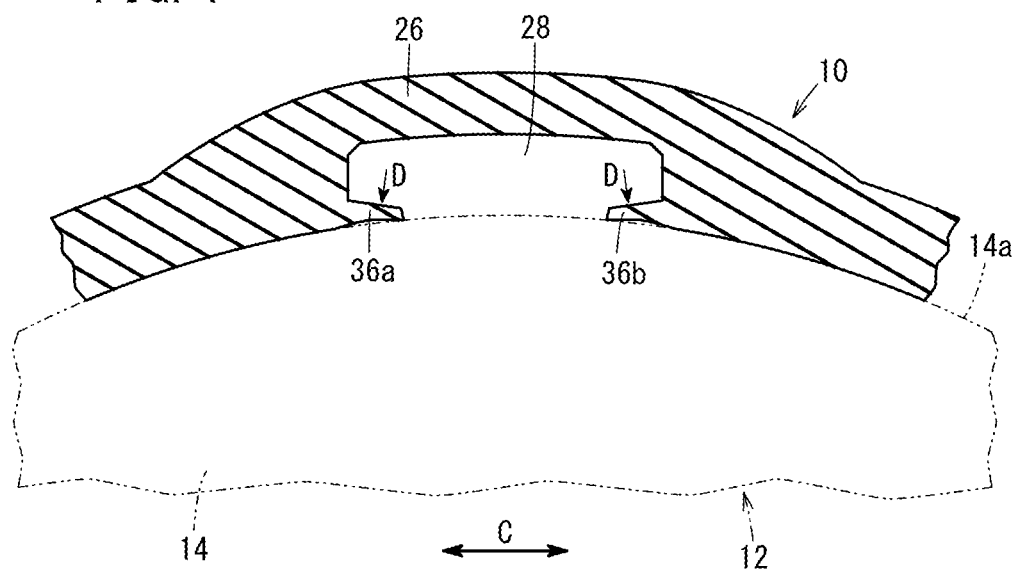
FIG. 4 is a cross-sectional view of the ejection nozzle member taken along line IV-IV of FIG. 3.

As shown in FIG. 4, the seal members 36a, 36b, for example, are disposed along the direction of extension of the air passage 28 and the ejection hole 34. The seal members 36a, 36b extend in directions away from the air ejecting unit 26, and more specifically, project downwardly, and are formed in lip shapes extending in slanted directions toward the center in the widthwise direction of the air passage 28. In other words, the seal members 36a, 36b are formed along a boundary between the air ejecting unit 26 (cover member 22) and the air passage 28. Further, the seal members 36a, 36b are formed in tapered shapes that taper toward the distal ends thereof.

In addition, the seal members 36a, 36b abut with respect to the rear end surface 14a of the vehicle-mounted camera 12 in a manner so that the distal ends thereof face inwardly mutually in the widthwise direction.

The ejection nozzle member 10 according to the embodiment of the present invention is configured basically in the manner described above. Next, operations and effects of the ejection nozzle member 10 will be described.

Initially, after adherence of water droplets, dust and the like to the lens 20 in the vehicle-mounted camera 12 has been confirmed, a compressed air supply source (not shown) is operated on the basis of a control signal from a non-illustrated controller or an operation of an operator, and high pressure compressed air is supplied via the piping 32 to the connecting pipe 30. The compressed air passes from the connecting pipe 30 through the cover member 22 and the air passage 28 of the air ejecting unit 26, and is ejected from the ejection hole 34 toward the lens 20 of the vehicle-mounted camera 12, whereby the compressed air blows off the water droplets and the like that are adhered to the lens 20.

At this time, since the seal members 36a, 36b are pressed toward the casing 14 (in the direction of arrow D in FIG. 4) by the compressed air that flows through the air passage 28, the seal members 36a, 36b are held in more intimate contact with respect to the casing 14, whereby the sealing ability is enhanced. Further, even in the case that the air ejecting unit 26 rises (upwardly) in a direction away from the casing 14 due to the high pressure compressed air that flows through the air passage 28, by the lip-shaped seal members 36a, 36b being pressed toward the casing 14 by the pressing force of the compressed air and becoming deformed in an upright direction, the state of abutment of the seal members 36a, 36b is reliably maintained. Therefore, simultaneously with leakage of the compressed air to the exterior of the air passage 28 being prevented, water droplets, dust, and the like which have entered into and remain between the surface of the vehicle-mounted camera 12 and the ejection nozzle member 10 are reliably prevented from entering into the interior of the air passage 28.

In the foregoing manner, according to the present embodiment, in the ejection nozzle member 10 for removing water droplets and the like adhered to the lens 20 of the vehicle-mounted camera 12, the air passage 28 through which the compressed air flows is provided in the interior of the cover member 22 that is attached to the vehicle-mounted camera 12, and in the air ejecting unit 26 formed at the end of the cover member 22, the lip-shaped seal members 36a, 36b are formed on outer sides of the air passage 28 in the widthwise direction, and the seal members 36a, 36b are made to incline toward the side of the air passage 28 and the side of the casing 14, and are brought into abutment against the rear end surface 14a of the casing 14.

Consequently, when the compressed air is supplied to the air passage 28 and ejected from the ejection hole 34, and the water droplets and the like adhered to the lens 20 of the vehicle-mounted camera 12 are blown off, the seal members 36a, 36b are pressed toward the casing 14 by the compressed air inside the air passage 28, whereby the seal members 36a, 36b can be brought into more intimate contact with the casing 14 and provide a hermetic seal. Therefore, even in the case that the ejection nozzle member 10 rises up away from the vehicle-mounted camera 12 by the pressure of the compressed air, the distal end sides of the seal members 36a, 36b are deformed so as to spread outwardly in the widthwise direction while remaining in abutment against the rear end surface 14a of the casing 14, whereby the state of abutment with respect to the casing 14 is reliably maintained, and the sealing ability is preserved.

As a result, the seal members 36a, 36b of the ejection nozzle member 10 can be made to abut at all times with respect to the casing 14 of the vehicle-mounted camera 12, and even in the case that the ejection nozzle member 10 becomes slightly separated from the casing 14, entry of water droplets, dust and the like intervening between both members into the interior of the air passage 28 can reliably be prevented. Further, leakage of the compressed air in the air passage 28 to the exterior can also be prevented by the pair of seal members 36a, 36b.

Therefore, after water droplets and the like adhered to the lens 20 have been removed by the compressed air, movement of such water droplets and the like, which have entered into the air passage 28, toward the side of the lens 20, and the water droplets becoming adhered again to the lens 20 can be avoided.

Furthermore, the ejection nozzle member 10 is attached to the upper surface 14b of the vehicle-mounted camera 12, and by providing the air ejecting unit 26, from which the compressed air is ejected, so as to extend toward the lens 20 of the rear end surface 14a, the amount of protrusion toward the rear side (in the direction of arrow A in FIG. 1) of the vehicle on which the vehicle-mounted camera 12 is mounted can be suppressed. As a result, no limitation is imposed on the space behind the vehicle, and effective use of such space is made possible.

Further still, by the ejection nozzle member 10 being made of an elastic material, it also is capable of functioning as a protector that covers portions of the upper surface 14b and the rear end surface 14a of the vehicle-mounted camera 12, and therefore, the ejection nozzle member 10 can be protected from coming into contact with the vehicle-mounted camera 12.

Figure 5:
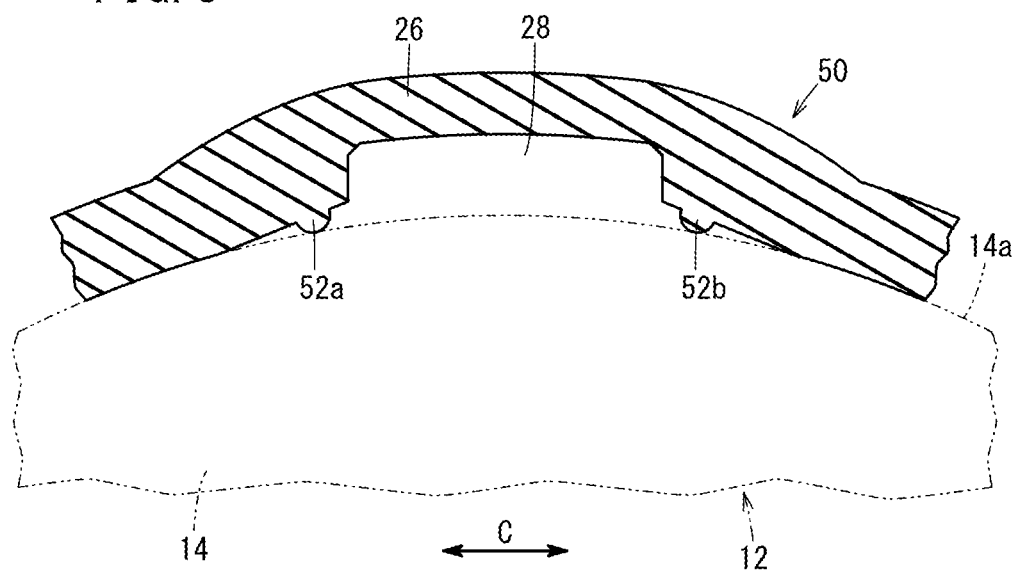
FIG. 5 is a cross-sectional view showing the vicinity of a distal end of the ejection nozzle member according to the modified example.

Further, the seal members 36a, 36b in the air ejecting unit 26 are not limited to the case of being formed in lip shapes as described above. For example, as with the seal members 52a, 52b of the ejection nozzle member 50 shown in FIG. 5, the seal members may be formed with a semicircular cross section bulging outwardly from a lower surface of the air ejecting unit 26.

Furthermore, according to the above-described embodiment, a case has been described in which the vehicle-mounted camera 12 to which the ejection nozzle members 10, 50 are attached is a rear camera provided on a rear portion of the vehicle. However, the present invention is not limited to this feature. For example, the vehicle-mounted camera 12 may be a front camera provided on a front portion of the vehicle.

The ejection nozzle member according to the present invention is not limited to the above-described embodiment, and it is a matter of course that various additional or alternative configurations could be adopted therein without departing from the scope of the present invention.

What is claimed is:

1. An ejection nozzle member configured to eject compressed air with respect to a lens surface of a vehicle-mounted optical device, comprising:
    a cover member attached to the vehicle-mounted optical device and having therein an air passage through which the compressed air flows;
    a pipe connecting part provided on the cover member and configured to supply the compressed air to the air passage; and
    an air ejecting unit formed at an end of the cover member and communicating with the air passage, the air ejecting unit being configured to eject the compressed air toward the lens surface;
    wherein the air ejecting unit is formed to have a clearance between the air ejecting unit and the lens surface in the cover member, a seal member is formed on the cover member along a boundary with the air ejecting unit, and the seal member is formed in an inclined manner toward a side of the air ejecting unit.

2. The ejection nozzle member according to claim 1, wherein the vehicle-mounted optical device includes:
    a first surface having the lens surface; and
    a second surface adjacent to the first surface; and the ejection nozzle member is placed on the second surface, and the cover member and the air ejecting unit extend from the second surface toward the lens surface of the first surface.

3. The ejection nozzle member according to claim 1, wherein the ejection nozzle member is made of an elastic material.

4. The ejection nozzle member according to claim 2, wherein the ejection nozzle member is made of an elastic material.

5. The ejection nozzle member according to claim 1, wherein the air ejecting unit is disposed so as to extend toward the lens surface.

6. The ejection nozzle member according to claim 1, wherein the seal member comprises a pair of seal members disposed so as to protrude toward a central side of the air passage.

7. The ejection nozzle member according to claim 6, wherein each of the seal members is formed in a lip shape that tapers toward a distal end thereof.

\* \* \* \* \*